United States Patent

West et al.

[11] Patent Number: 5,292,103
[45] Date of Patent: Mar. 8, 1994

[54] DRAIN VALVE

[75] Inventors: Christopher P. West; David B. Neuwen, both of Malaga, Australia

[73] Assignee: Pollution Control Pty. Ltd., Mt. Lawley, Australia

[21] Appl. No.: 898,679

[22] Filed: Jun. 15, 1992

[30] Foreign Application Priority Data

Jun. 25, 1991 [AU] Australia .............. PK 6843

[51] Int. Cl.[5] .......................................... F16K 31/122
[52] U.S. Cl. ................................ 251/30.05; 251/33; 251/63; 251/144; 261/DIG. 3; 261/DIG. 46
[58] Field of Search ............. 251/30.05, 33, 63, 63.5, 251/63.6, 144; 261/DIG. 3, DIG. 46

[56] References Cited

U.S. PATENT DOCUMENTS

| | | | |
|---|---|---|---|
| 1,647,826 | 11/1927 | Feeley et al. | 251/63 |
| 2,142,289 | 1/1939 | Sloan | 261/DIG. 46 X |
| 2,147,722 | 2/1939 | Stern | 251/63 |
| 2,882,008 | 4/1959 | Giauque | 251/61.4 |
| 3,151,835 | 10/1964 | Miller | 251/63 |
| 3,315,696 | 4/1967 | Hunter | 251/63 X |
| 3,552,658 | 1/1971 | Sons | 251/63 X |
| 3,727,877 | 4/1973 | Beguiristain | 251/63 X |
| 3,867,485 | 2/1975 | Yeagle | 261/DIG. 46 X |
| 4,038,347 | 7/1977 | Mickley | 261/DIG. 46 X |
| 4,122,864 | 10/1978 | Tardy et al. | 137/625.6 |
| 4,272,052 | 6/1981 | Gidner . | |

FOREIGN PATENT DOCUMENTS

49797/85 12/1985 Australia .
109467 5/1984 European Pat. Off. .

Primary Examiner—Gerald A. Michalsky
Attorney, Agent, or Firm—Larson and Taylor

[57] ABSTRACT

A valve (10) for draining liquid from a reservoir, for example, the reservoir (56) in the base of an evaporative cooler (50). The valve (10) comprises a housing (12) having a first inlet (14) for supplying a pressure transmitting fluid, for example water, to the housing and an outlet (18) for draining liquid from the reservoir. A plunger (22) is slidably received in the housing (12) and adapted to move from an open position in which the outlet (18) is open and liquid can drain out, and a closed position in which the plunger (22) closes the outlet (18) and the liquid is prevented from draining out. Water is supplied under pressure to the upper portion (32) of the housing via inlet (14) and a sealing ring (36) allows a build-up of pressure in the upper portion (32), sufficient to overcome the force of a biasing spring (24), to cause the plunger (22) to move from its open to its closed position. When the water pressure in upper portion (32) of the housing is reduced, the spring (24) causes the plunger (22) to return to its open position. The valve (10) can be fitted to an evaporative cooler so as to automatically open and close when the cooler is switched OFF and ON respectively.

14 Claims, 3 Drawing Sheets

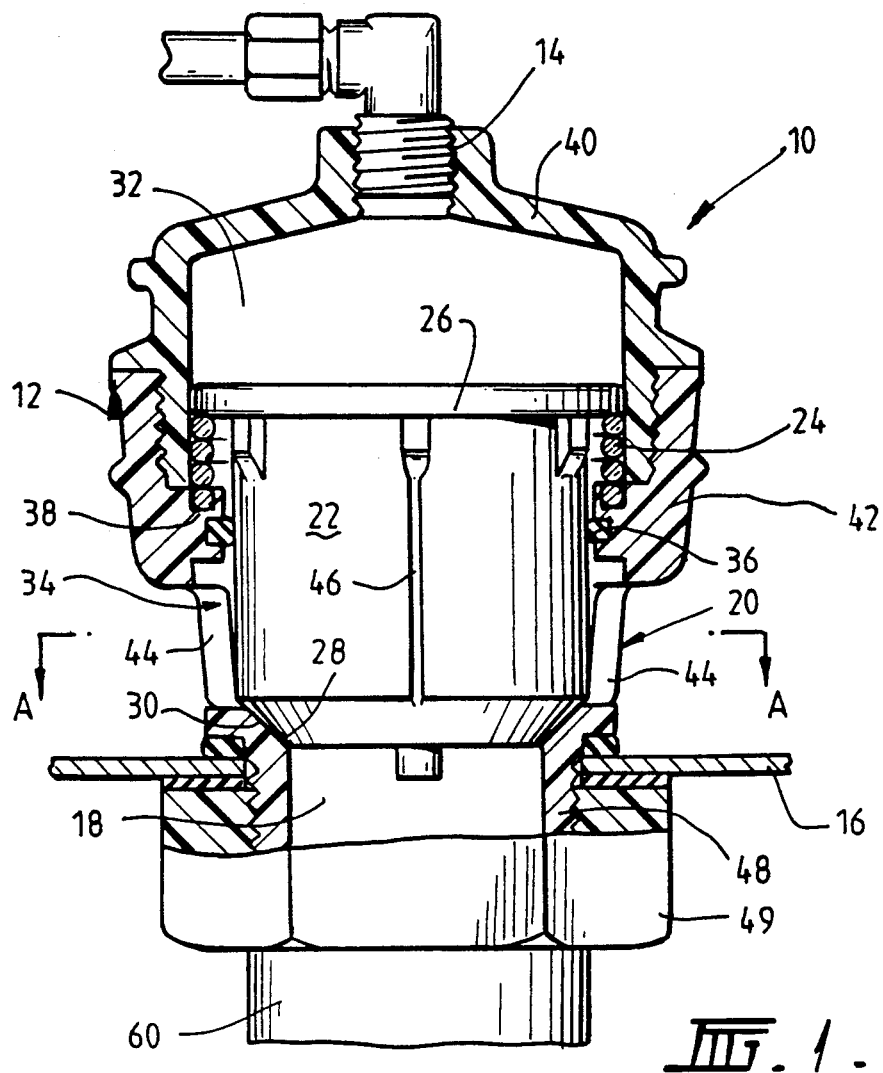
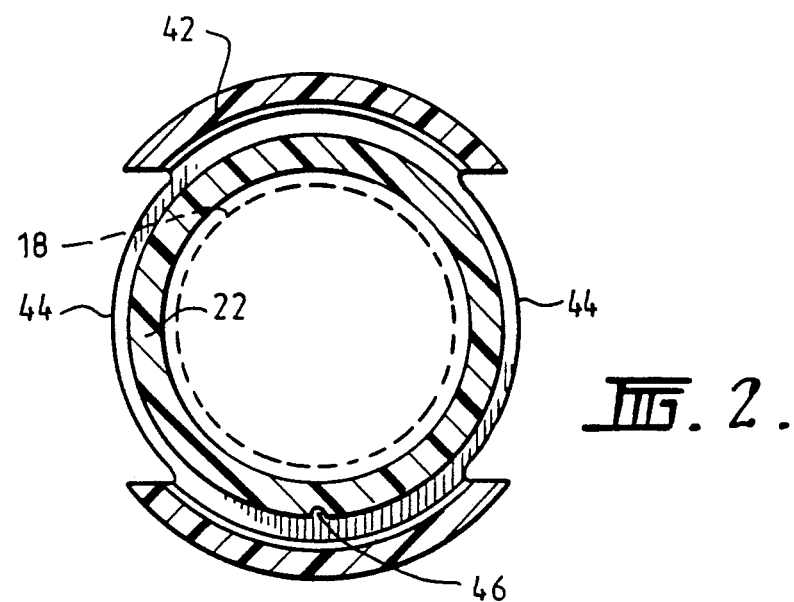

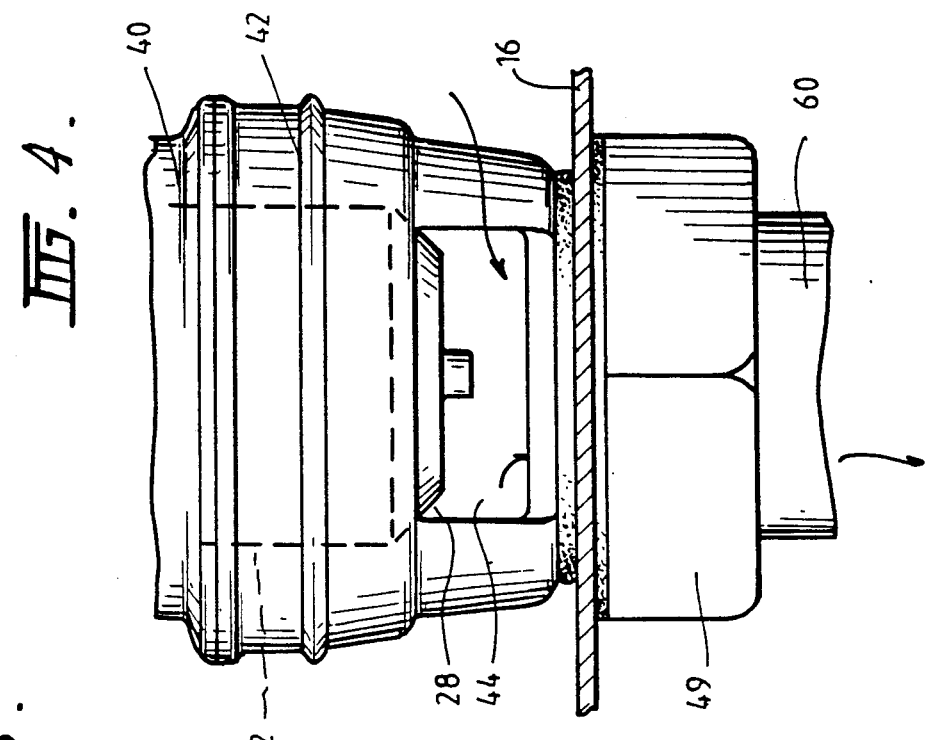
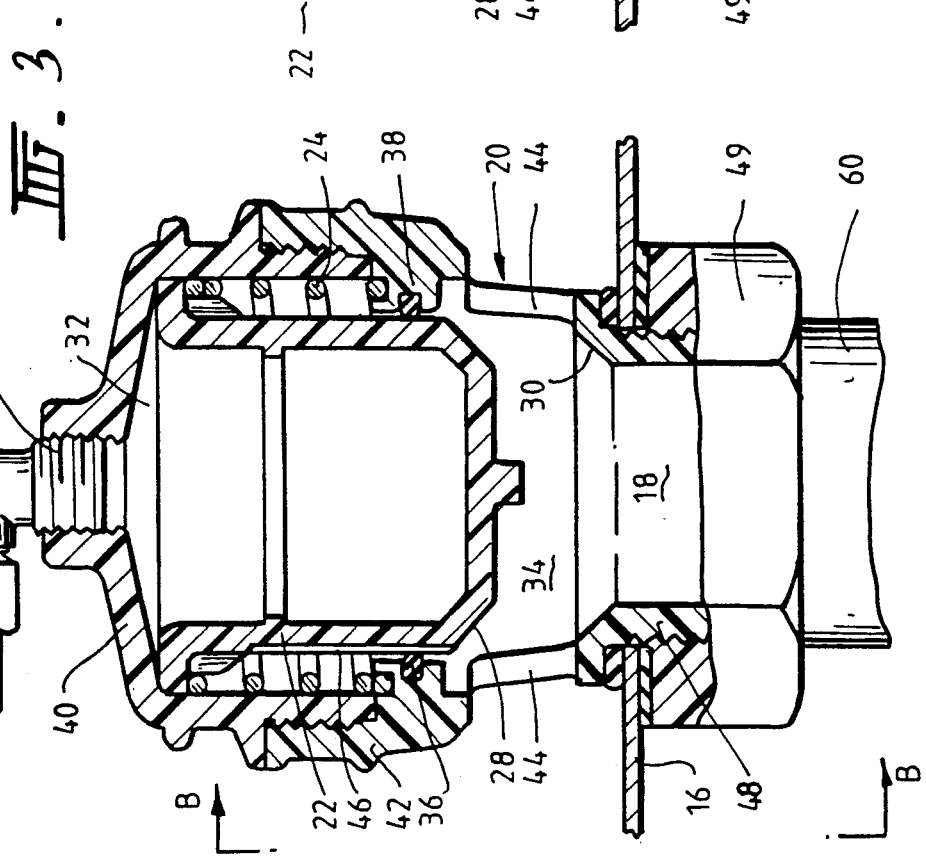

DRAIN VALVE

FIELD OF THE INVENTION

The present invention relates to a drain valve for draining liquid from a reservoir such as a tank, trough, pipe, or sump and relates particularly, though not exclusively, to an automatic dump valve for use in evaporative air conditioners.

BACKGROUND OF THE INVENTION

An evaporative air conditioner or cooler typically comprises a box-like enclosure having louvred side walls that are lined with a filter medium. A fan is located within the enclosure for drawing air into the enclosure through the filter medium. The air is then forced by the fan into the space or room to be cooled. The cooling of the air is achieved by evaporation of water as it passes through the filter medium which is kept saturated with water. The filter medium is supplied with water from a sump or reservoir in the base of the enclosure by a recirculation pump.

As water is continuously lost to the atmosphere by evaporation, a water supply line replenishes the reservoir in the base of the enclosure with fresh water. The water level in the reservoir is typically maintained at a constant level by a float valve provided in the water supply line. Over time the recycled water in the reservoir becomes saturated with minerals and salts which results in problems with corrosion and blockages. Furthermore, the water in the reservoir can also be an ideal incubator for bacteria and other micro-organisms. Accordingly, various arrangements have been proposed for preventing this build up of salts and/or for draining the sump or reservoir of water to avoid these problems.

AU 49797/85 (CELI MANUFACTURING PTY. LIMITED) describes a bleed-off valve for an evaporative cooler designed to overcome deficiencies in the use of a prior art bleed-off line and clamping arrangement provided in the fluid line between the recirculation pump and a water distribution point at the top of the enclosure. The bleed-off valve of AU 49797/85 is typically located in the fluid line between the recirculation pump and water distribution point and comprises a gate valve that facilitates manual adjustment of the bleed-off flow rate using a tap-type valve actuating means. Thus the problems with the use of the prior art bleed-off line and clamping arrangement are eliminated. However, the provision of a bleed-off valve does not overcome the problems associated with water retained in the reservoir after the cooler is switched off.

Other prior art arrangements include the provision of a dump valve in the sump or reservoir for draining the water when the cooler is switched off. The prior art dump valves typically include a solenoid operated valve or a flap valve actuated by mechanical linkages that can be manually operated or that operate in conjunction with the float valve to drain the reservoir at regular intervals. A disadvantage of these prior art systems is the increased complexity of the water flow control system with an attendant reduced reliability. A further disadvantage is that such systems tend to waste excessive amounts of water.

SUMMARY OF THE INVENTION

The present invention was developed with a view to providing a valve for more efficiently draining water from a reservoir in an evaporative cooler, but that can be used in any application where a liquid must be drained from a reservoir.

According to the present invention there is provided a valve for draining liquid from a reservoir, the valve comprising:

a housing having a first inlet for supplying a pressure transmitting fluid to the housing and an outlet for draining liquid from the reservoir;

a plunger slidably received in said housing and adapted to move between an open position in which said outlet is open and liquid can drain out, and a closed position in which said plunger closes said outlet and said liquid is prevented from draining out, and wherein when said pressure transmitting fluid is supplied to the housing under pressure it can cause said plunger to move from its open to its closed position.

Preferably a biasing means is provided within the housing for biasing said plunger towards its open position, wherein said pressure transmitting fluid must overcome the force of said biasing means in order to move the plunger from its open to its closed position.

In the preferred embodiment said housing comprises an upper portion and a lower portion separated by a sealing means through which the plunger is free to move. The first inlet opens into the upper portion of the housing and the outlet is provided in the lower portion of the housing, said sealing means allowing a build up of pressure in the pressure transmitting fluid in the upper portion of the housing to cause the plunger to move from its open to its closed position.

In the preferred embodiment the housing is further provided with a second inlet in said lower portion for allowing liquid to flow into the housing and out through said outlet.

Preferably the housing is substantially cylindrical in shape and said plunger is also substantially cylindrical in shape, the plunger being received coaxially within the housing. Typically the plunger is of hollow construction having an annular lip protruding outwardly from an upper periphery and a sealing surface at a lower periphery, said sealing surface being adapted to seat in sealing engagement with the outlet when the plunger is in its closed position.

According to another aspect of the present invention there is provided an evaporative cooler comprising:

a reservoir for holding water used to keep a filter medium saturated with water;

a water supply line for replenishing the reservoir with fresh water; and, a dump valve for draining the reservoir of water, the valve comprising:

a housing having a first inlet for supplying a pressure transmitting fluid to the housing and an outlet for draining liquid from the reservoir;

a plunger slidably received in said housing and adapted to move between an open position in which said outlet is open and liquid can drain out, and a closed position in which said plunger closes said outlet and said liquid is prevented from draining out, and wherein when said pressure transmitting fluid is supplied to the housing under pressure it causes said plunger to move from its open to its closed position.

Typically the pressure transmitting fluid is water supplied under pressure to the housing through a separate line connected to the water supply line, and preferably said water supply line is provided with a solenoid controlled valve whereby, in use, the supply of water to the housing can be controlled to control the position of the plunger. Advantageously when the evaporative cooler is switched ON the solenoid controlled valve is opened to supply water under pressure through the supply line to replenish the reservoir, and through the separate line to the dump valve housing to move the plunger to its closed position.

Preferably biasing means are provided within the housing for biasing the plunger to its open position whereby, in use, when the evaporative cooler is switched OFF and the solenoid controlled valve is closed to cut off the supply of water through the separate line to the dump valve housing, the water pressure in the housing can be reduced so that the plunger moves from its closed position to its open position.

BRIEF DESCRIPTION OF THE DRAWINGS

In order to facilitate a better understanding of the nature of the invention a preferred embodiment of the drain valve will now be described in detail, by way of example only, with reference to the accompanying drawings in which:

FIG. 1 is a part section view of a preferred embodiment of the drain valve showing the plunger in a closed position;

FIG. 2 is a section view through the line A—A in FIG. 1;

FIG. 3 is a section view through the drain valve of FIG. 1 showing the plunger in its open position;

FIG. 4 is a side elevation of the valve in the direction of B—B in FIG. 3; and,

DETAILED DESCRIPTION OF PREFERRED EMBODIMENT

Figure 5:
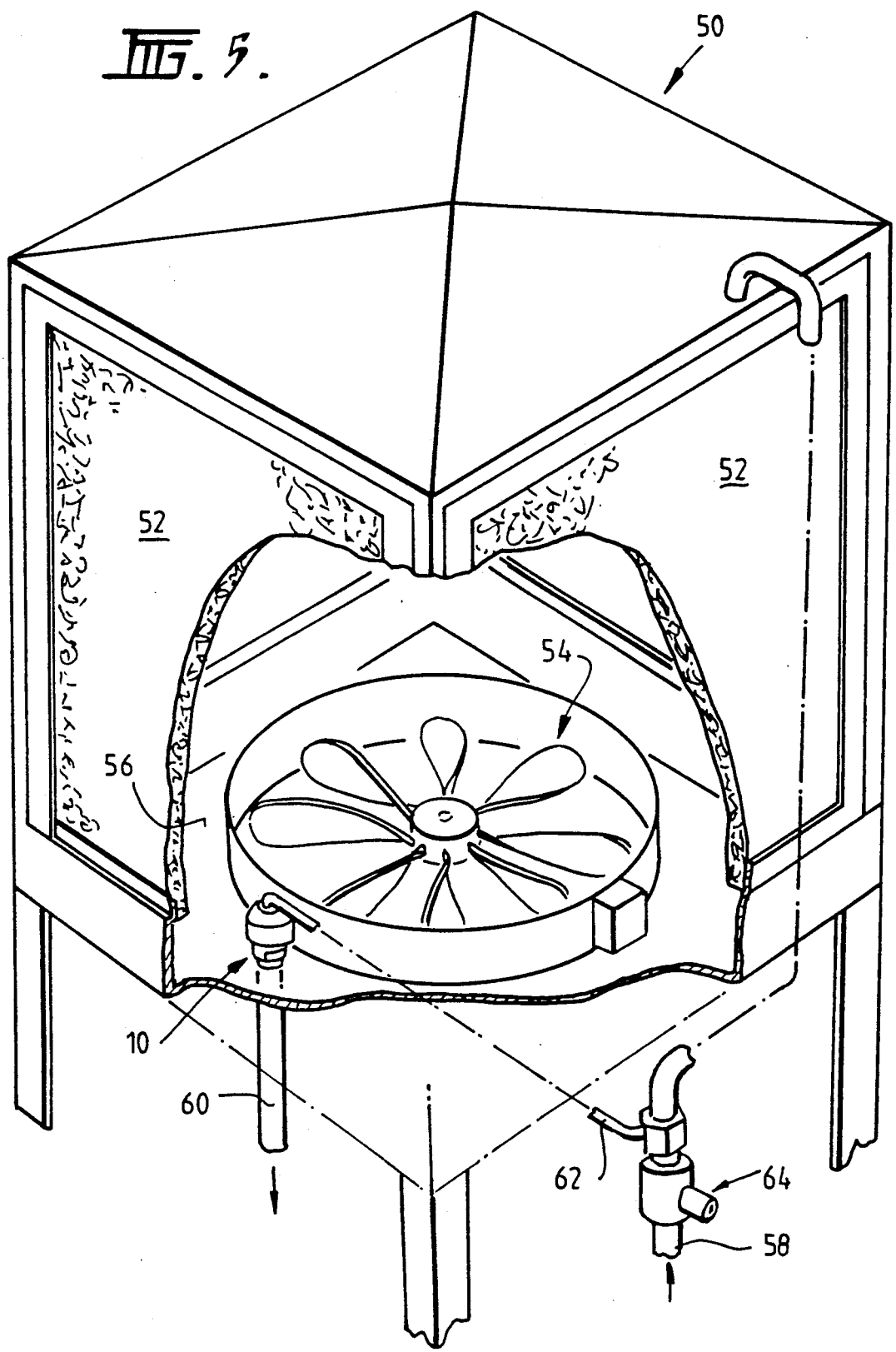
FIG. 5 illustrates the operation of the drain valve in an evaporative cooler.

Referring to FIGS. 1 to 4, the drain valve 10 comprises a housing 12 having a first inlet 14 for supplying a pressure transmitting fluid to the housing 12. The valve 10 is typically mounted in the base 16 of a reservoir and is provided with an outlet 18 for draining liquid from the reservoir. The housing 12 further comprises a second inlet 20 for allowing liquid from the reservoir to flow into the housing 12 and out through the outlet 18. A plunger 22 is slidably received in the housing 12 and adapted to move between an open position, (as illustrated in FIGS. 3 and 4) in which the outlet 18 is open and liquid can drain out, and a closed position, (as illustrated in FIG. 1) in which the plunger 22 closes the outlet 18 and the liquid from the reservoir is prevented from draining out. The plunger 22 can be caused to move from its open to its closed position by supplying a pressure transmitting fluid to the housing 12 through the first inlet 14. A standard brass fitting is screwed into the top of the housing 12 to allow the connection of a pipe or flexible tube or hose for supplying the pressure transmitting fluid. Any suitable pressure transmitting fluid may be employed, for example, compressed air or hydraulic oil, however in this embodiment water is employed as the pressure transmitting fluid.

In the preferred embodiment, biasing means in the form of a coil spring 24 is provided within the housing 12 for biasing the plunger 22 towards its open position so that the water supplied through inlet 14 must first overcome the force of the coil spring 24 in order to move the plunger from its open to its closed position. As can be seen most clearly in FIG. 2, the housing 12 is substantially cylindrical in shape and the plunger 22 is also substantially cylindrical in shape, the plunger 22 being received coaxially within the housing. The plunger 22 is of hollow construction having a cylindrical wall with an annular lip 26 protruding outwardly at an upper periphery of the wall, and having a frusto-conical sealing surface 28 at a lower periphery of the wall. The sealing surface 28 is adapted to seat in sealing engagement with a corresponding frusto-conical seating surface 30 provided in the mouth of outlet 18, when the plunger 22 is in its closed position.

The housing 12 comprises an upper portion 32 and a lower portion 34 separated by a sealing means, in the form of a sealing ring 36 of resilient material held captive by a seal retaining ring 38, through which the plunger 22 is free to move. The first inlet 14 opens into the upper portion 32 of the housing whereas the second inlet 20 opens into the lower portion 34 of the housing. The sealing ring 36 allows a build-up of pressure in the water supplied to the upper portion 32 of the housing to enable the plunger to move from its open to its closed position.

As can be seen most clearly in FIGS. 1 and 3 the upper portion 32 of the housing is formed by a cap 40 which is fitted to the main body 42 of the housing by a screw thread in sealing engagement. The seal retaining ring 38 is formed on the inner circumference of the main body portion 42 just above inlet 20. Coil spring 24 is located between a top surface of the seal retaining ring 38 and the underside of the lip 26 of the plunger 22. The second inlet 20 is preferably formed by a pair of apertures or slots 44 provided in the lower wall section of the main body portion 42 of the housing, as can be seen most clearly in FIGS. 2 and 4. When the plunger 22 is raised to its open position, liquid in the reservoir is free to flow through the apertures 44 into the lower portion 34 of the housing and out through the outlet 18, as illustrated in FIGS. 3 and 4.

In this embodiment, the plunger 22 is provided with pressure relief means in the form of a groove 46 in an outer circumferential surface thereof. Groove 46 traverses the sealing ring 36 and provides a channel through which water from the upper portion 32 of the housing can escape past the sealing ring 36 into the lower portion 34 of the housing. As water is supplied under pressure through inlet 14 to the upper portion 32 of the housing a small quantity of water escapes continuously through groove 46. Thus, when the pressure of the water supplied to the upper portion 32 of housing is reduced, the coil spring 24 is able to return the plunger 22 to its open position as the water escapes from the upper portion 32 through groove 46. Groove 46 is sized sufficiently small so that in normal operation the pressure build-up of the water in the upper portion 32 is sufficiently large to overcome the biasing force of the coil spring 24 to maintain the plunger 22 in its closed position. A minimum water pressure of typically 30 kPa is required to maintain the plunger 22 in its closed position, which is well below the mains pressure of most domestic water supplies.

The outlet 18 is formed in the main body portion 42 of the housing in the form of a spigot 48 provided with a screw thread on its outer circumferential surface on which is received a fastening nut 49. The spigot 48 is inserted through an appropriately sized aperture provided in the base 16 of the reservoir and connected thereto by screwing the nut 49 thereto. A rubber sealing ring or washer may be provided between the base 16 of the reservoir and the nut 49 and/or the under side of the lower portion of the housing in order to seal the valve housing to the base 16 of the reservoir.

The operation of the drain valve 10 in an evaporative cooler will now be described in detail, with particular reference to FIG. 5.

FIG. 5 illustrates an evaporative cooler 50 comprising a box-like enclosure 52 having louvred walls that are lined with a filter medium 52. A fan 54 is located in the base of the cooler 50 for drawing air into the enclosure through the filter medium 52. A recirculation pump (not illustrated) recirculates water continuously from a reservoir 56 in the base of the cooler to the top of the enclosure to keep the filter medium 52 saturated with water. A water supply line 58 replenishes the reservoir 56 in the base of the enclosure with fresh water, in order to replace water lost to atmosphere due to evaporation. The drain or dump valve 10 is located in the base of the reservoir 56 with a drain pipe or hose 60 connected to its outlet. A separate line 62 connected to the water supply line 58 supplies water under pressure to the upper portion of the valve housing through inlet 14.

In this application to an evaporative cooler, a solenoid controlled valve 64 is provided in the water supply line 58 whereby, in use, the supply of water to the upper portion of the valve housing can be controlled to control the position of the plunger 22 within the housing. The solenoid valve 64 is connected in the electrical control circuit for the recirculation pump so that when the evaporative cooler is switched ON in the cooling mode the solenoid valve 64 is opened to supply water under pressure through the supply line 58 to replenish the reservoir, and through the separate line 62 to the dump valve 10 to move the plunger to its closed position. The level of the water in reservoir 56 is controlled by a float valve (not illustrated) provided in the water supply line 58. Even when the level of water in reservoir 56 causes the float valve to shut off the supply of water through supply line 58, the water pressure within the separate line 62 is maintained, provided the solenoid valve 64 remains open. Hence, whilst solenoid valve 64 remains activated the plunger 22 in dump valve 10 remains in its closed position. However, when the evaporative cooler 50 is switched OFF and the solenoid valve 64 is closed, the supply of water through the separate line 62 to the dump valve is cut-off. Hence the water pressure in the upper portion of the valve housing can be reduced as water escapes through groove 46, so that the plunger 22 moves towards its open position under the action of coil spring 24.

In use, when the evaporative cooler is switched ON in the cooling mode, solenoid valve 64 opens and water is supplied through the supply line 58 to replenish the reservoir 56, and through the separate line 62 to cause the dump valve 10 to close. When the level of water in reservoir 56 reaches a maximum, the flow of water through supply line 58 is reduced to a minimum, but the water pressure in the separate line 62 is maintained so that the dump valve 10 remains closed. The evaporative cooler then continues to operate in a conventional manner. When the evaporative cooler is switched OFF solenoid valve 64 is deactivated and the pressure in the separate line 62 reduces so that the plunger 22 in the dump valve 10 can move from its closed to its open position. Water in the reservoir 56 then drains out through the apertures 44 in the side walls of the valve housing and out through the outlet 18 to the drain pipe 60. Thus, the reservoir 56 can be completely drained of water and the problems associated with build-up of minerals, salts and micro-organisms in the reservoir can be eliminated. By having the dump valve 10 actuated by water from the water supply line 58, the dump valve can be automatically closed and opened when the air cooler is switched ON and OFF respectively.

The above-described preferred embodiment of the drain valve 10 can be readily manufactured from injection moulded plastics material, for example polyvinylchloride (PVC). The relatively simple design and low number of moving parts means that the drain valve is extremely reliable and requires little or no maintenance.

Now that a preferred embodiment of the drain valve, and its application as an automatic dump valve in an air cooler, have been described in detail, it will be obvious that numerous variations and modifications may be made to the illustrated embodiment without departing from the basic inventive concepts. For example, the housing 12 and plunger 22 need not be of cylindrical construction, and furthermore the design of the housing 12 may be of any suitable shape or configuration. Such variations and modifications are to be considered within the scope of the present invention, the nature of which is to be determined from the foregoing description and the appended claims.

The claims defining the invention are as follows:

1. A valve for draining liquid from a reservoir of an evaporative cooler, the liquid in the reservoir being at atmospheric pressure, the valve comprising:

a housing adapted to be mounted within the reservoir and having a first inlet for supplying liquid under pressure to the housing, an outlet for draining liquid from the reservoir, and a second inlet for allowing liquid from the reservoir to flow into said housing and out through said outlet;

a plunger slidably received within said housing and adapted to move between an open position in which said outlet is open and liquid can drain out, and a closed position in which said plunger closes said outlet and said liquid is prevented from draining out, and wherein when liquid is supplied to the housing under pressure it can cause said plunger to move from its open to its closed position;

a biasing means provided within the housing for biasing said plunger towards its open position, wherein the pressure of the liquid supplied to the housing must overcome the force of said biasing means in order to move the plunger from its open to its closed position and wherein when the pressure of the liquid supplied to the housing is reduced sufficiently, said biasing means automatically moves the plunger to its open position to allow the reservoir to drain; and pressure relief means, fitted in said plunger, including a passage through which a controlled quantity of said liquid under pressure can escape continuously into the reservoir to relieve the pressure of liquid acting on the plunger within the housing whereby, in use, when the supply of liquid to the housing is cut off the pressure of liquid within the housing is reduced sufficiently by said pressure relief means to allow the biasing means to automatically move the plunger to its open position.

2. A valve as claimed in claim 1, wherein said housing comprises an upper portion and a lower portion separated by a sealing means through which the plunger is free to move.

3. A valve as claimed in claim 2, wherein the first inlet opens into the upper portion of the housing and the second inlet and outlet are provided in the lower portion of the housing, said sealing means allowing a build up of pressure in the liquid in the upper portion of the housing to cause the plunger to move from its open to its closed position.

4. A valve as claimed in claim 3, wherein the housing is substantially cylindrical in shape and said plunger is also substantially cylindrical in shape, the plunger being received coaxially within the housing.

5. A valve as claimed in claim 4, wherein the plunger is of hollow construction having an annular lip protruding outwardly from an upper periphery and a sealing surface at a lower periphery, said sealing surface being adapted to seat in sealing engagement with the outlet when the plunger is in its closed position.

6. A valve as claimed in claim 5, wherein said biasing means comprises a coil spring and wherein said passage of said pressure relief means comprises a longitudinal groove on an outer circumferential surface of the plunger for relieving the pressure of liquid in the upper portion of the housing.

7. An evaporating cooler comprising:
 a reservoir for holding water at atmospheric pressure, said water being used to keep a filter medium saturated with water;
 a water supply line for replenishing the reservoir with fresh water; and
 a dump valve for draining the reservoir of water, the valve including:
 a housing mounted within the reservoir and having a first inlet for supplying water under pressure to the housing, an outlet for draining water from the reservoir and a second inlet for allowing water from the reservoir to flow into said housing and out through said outlet;
 a plunger slidably received in said housing and adapted to move between an open position in which said outlet is open and water can drain out, and a closed position in which said plunger closes said outlet and said water is prevented from draining out, and wherein when water is supplied to the housing under pressure it causes said plunger to move from its open to its closed position;
 biasing means provided within the housing for biasing the plunger to its open position, wherein the pressure of the water supplied to the housing must overcome the force of said biasing means in order to move the plunger from its open to its closed position and wherein when the pressure of the water supplied to the housing is reduced sufficiently, said biasing means automatically moves the plunger to its open position thereby allowing the water to drain from the reservoir; and pressure relief means, fitted in said plunger, including a passage through which a controlled quantity of said water under pressure escapes continuously into the reservoir to relieve the pressure of water acting on the plunger within the housing whereby, in use, when the supply of water to the housing is cut off the pressure of water within the housing is reduced sufficiently by said pressure relief means to allow the biasing means to automatically move the plunger to its open position.

8. An evaporative cooler as claimed in claim 7, wherein water is supplied under pressure to the housing through a separate line connected to the water supply line, and wherein said water supply line includes a solenoid controlled valve whereby, in use, the supply of water to the housing can be controlled to control the position of the plunger.

9. An evaporative cooler as claimed in claim 8, wherein the solenoid valve is connected in an electrical control circuit for the evaporative cooler whereby, in use, when the evaporative cooler is switched ON the solenoid controlled valve is opened to supply water under pressure through the supply line to replenish the reservoir, and through the separate line to the dump valve housing to move the plunger to its closed position.

10. An evaporative cooler as claimed in claim 7, wherein said housing comprises an upper portion and a lower portion separated by a sealing means through which the plunger is free to move.

11. An evaporative cooler as claimed in claim 10, wherein the first inlet opens into the upper portion of the housing and the second inlet and outlet are provided in the lower portion of the housing, said sealing means allowing a build up of pressure in the water in the upper portion of the housing to cause the plunger to move from its open position to its closed position.

12. An evaporative cooler as claimed in claim 11, wherein the housing is substantially cylindrical in shape and said plunger is also substantially cylindrical in shape, the plunger being received coaxially within the housing.

13. An evaporative cooler as claimed in claim 12, wherein the plunger is of hollow construction having an annular lip protruding outwardly from an upper periphery and a sealing surface at a lower periphery, said sealing surface sitting in sealing engagement with the outlet when the plunger is in its closed position.

14. An evaporative cooler as claimed in claim 13, wherein said biasing means comprises a coil spring and wherein said passage of said pressure relief means comprises a longitudinal groove on an outer circumferential surface of the plunger for relieving the pressure of the water in the upper portion of the housing.

* * * * *